Dec. 22, 1953  J. E. BROWN  2,663,091
EDUCATIONAL DEVICE
Filed Dec. 2, 1949  2 Sheets-Sheet 1
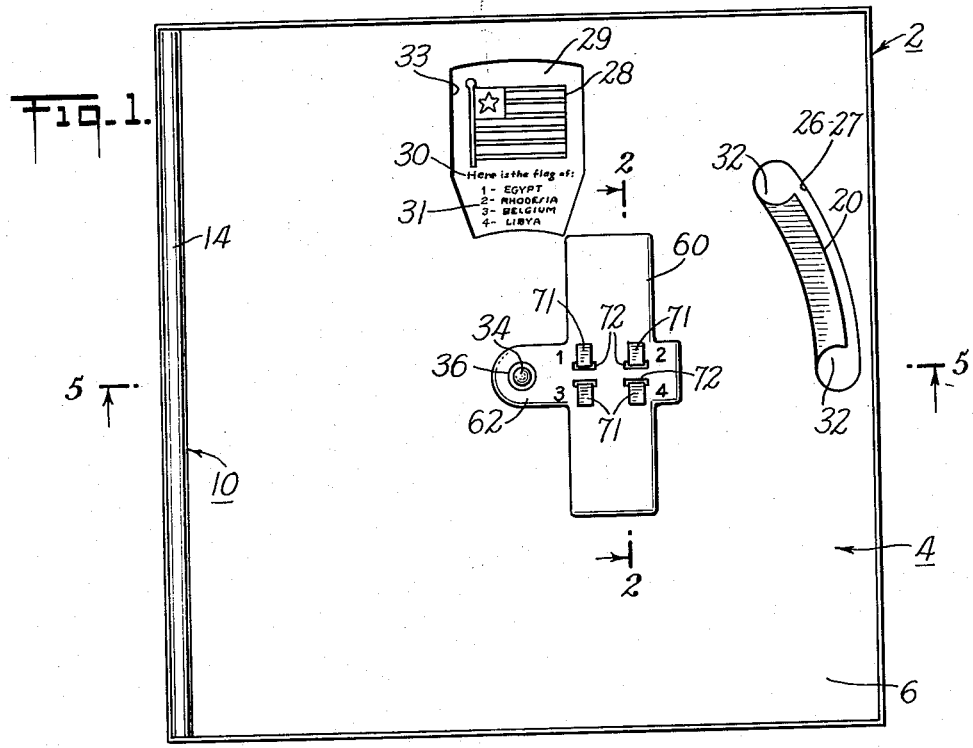
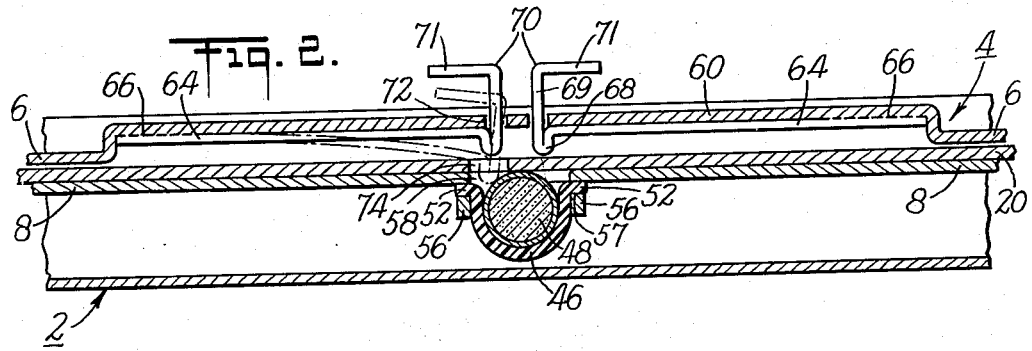
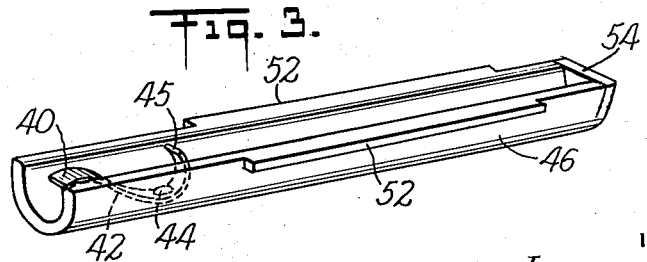
INVENTOR
James E. Brown
BY
Curtis, Morris & Safford
ATTORNEYS Dec. 22, 1953   J. E. BROWN   2,663,091
EDUCATIONAL DEVICE
Filed Dec. 2, 1949   2 Sheets-Sheet 2
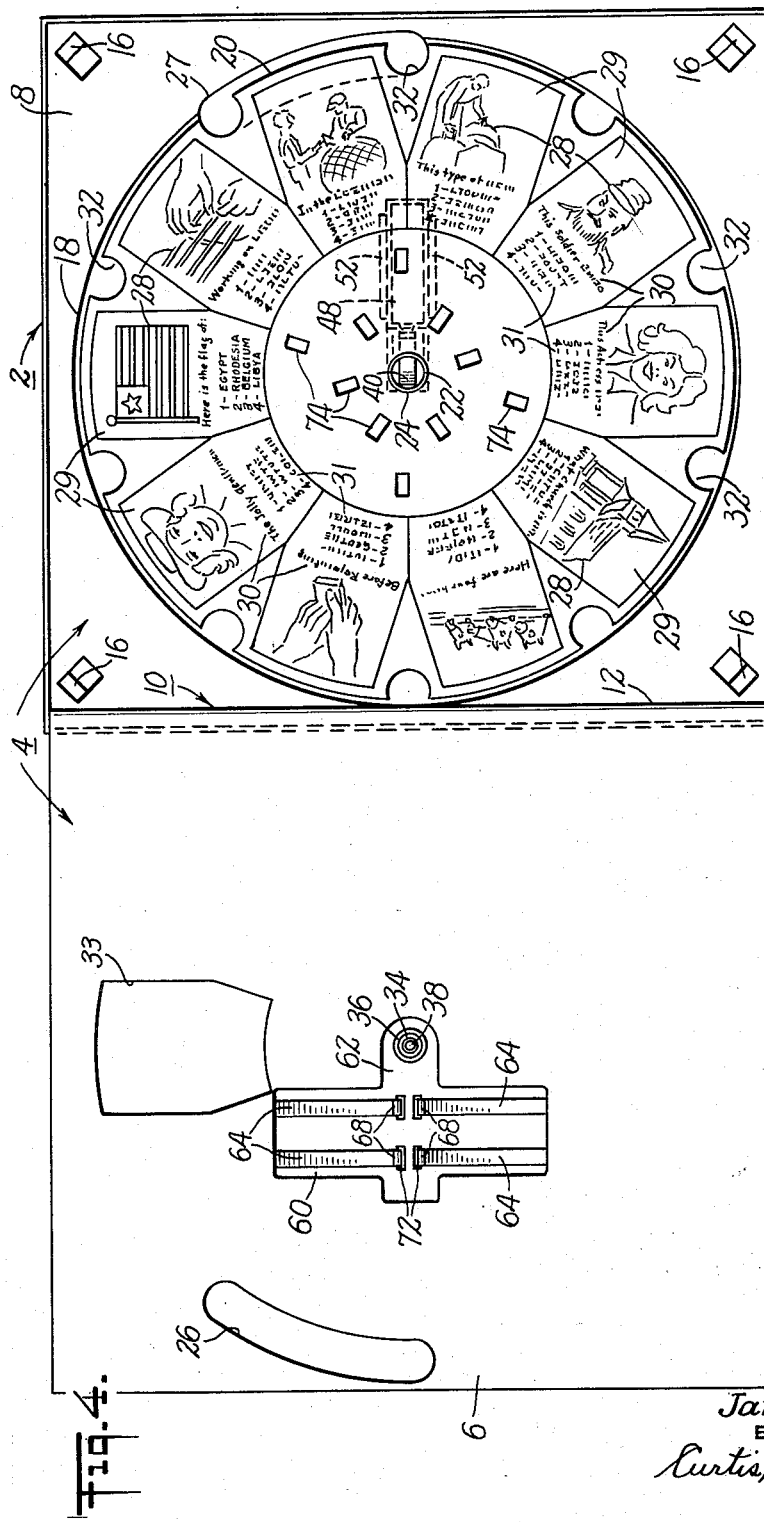
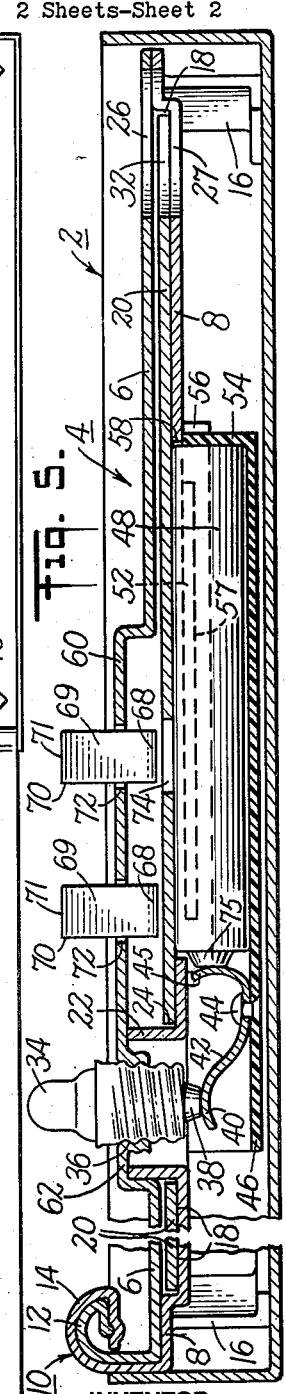
INVENTOR
James E. Brown
BY
Curtis, Morris + Safford
ATTORNEYS Patented Dec. 22, 1953

2,663,091

UNITED STATES PATENT OFFICE 2,663,091

EDUCATIONAL DEVICE

James E. Brown, Orange, N. J.

Application December 2, 1949, Serial No. 130,786

2 Claims. (Cl. 35—9)

This invention relates to education and entertainment, in particular to apparatus for testing knowledge of participants in a manner which is both entertaining and educational.

In the past, arrangements have been provided whereby a person's knowledge of certain subjects may be tested, by permitting him to select the correct answer from a group of several. Certain of these arrangements require a choice of only two answers so that, at least in theory, a large measure of chance is involved in answering questions of which the participant does not know the correct answer. Certain other arrangements involve the use of mechanisms which are quite bulky, complicated, and subject to getting out of order. Certain of the apparatus which has been used in the past has been very complicated to operate, so that the participants were tested more in respect to mechanical ability to operate the device than they were with respect to knowledge of answers to questions.

The present invention relates to this general subject matter, and contemplates the provision of apparatus of an improved character which is adapted to receive, and have used with it, test sheets or the like which bear the test data.

It is an object of the present invention to provide a device of the above character and a mode of operating the same which avoids certain of the difficulties encountered in the past. It is a further object to provide such devices which are dependable in use, simple and sturdy in construction, inexpensive to manufacture, pleasing in appearance, and easy to operate. A further object is to provide such devices which are adaptable to many fields of use including education, testing and examining procedures, and entertainment of both the more serious type and the less serious or frivolous type. It is a further object to provide a structure and a mode of operation whereby a single device is adaptable for use by people of all ages so that the device is universal in its application. These and other objects will be in part obvious and in part pointed out below.

In the drawings:

Figure 1 is a top plan view of one embodiment of the invention;

Figure 2 is an enlarged sectional view on the line 2—2 of Figure 1;

Figure 3 is a perspective view of the battery holding and contactor unit shown in section in the lower central portion of Figure 2;

Figure 4 is very similar to Figure 1 but showing the lid or top cover raised so that the test cards may be changed; and, Figure 5 is a vertical section on the line 5—5 of Figure 1.

The illustrative embodiment of the present invention is an educational or testing device or toy, by means of which the participant selects and indicates the proper answer to a question by pressing a selected button or switch. Illustratively, the questions relate to questioning such as the identification of various objects, people, or the like, each of which appears in a picture above a question and a group of possible answers. In each instance the group of answers are numbered consecutively and the operator may indicate his choice of the answers by depressing a correspondingly numbered one of a group of switch push buttons. The closing of the proper switch produces a signal which is here in the form of a signal light which goes on only when the push button corresponding to the correct answer is depressed. The sets of pictures and questions and possible answers appear in an annular zone on a test card, illustratively, a cardboard disc, which is arranged to fit within a casing. The disc is adapted to be rotated step-by-step so that each picture, together with its question and set of possible answers, appears to the operator through a window in the lid or top cover of the casing. The central portion of the disc is provided with an opening which is snugly received on a hub so that the disc turns without difficulty around its center axis. The area around this hub opening is so perforated that it permits the closing of a switch through an accurately located perforation when the switch push button corresponding to the proper answer is depressed and the signal light goes on. However, whenever one of the push buttons corresponding to the improper answer is depressed the disc blocks the closing of the corresponding switch and the signal light does not go on.

The disc is readily removable so that it may be replaced by another disc bearing another group of pictures with corresponding questions and a group of possible answers. As indicated above, the disc is perforated in a manner to correspond with the positioning of the switches whereby the appropriate switch is closed if the operator selects the proper answer to the question appearing through the window. However, the arrangement is such that it is difficult to determine the proper answers to the questions by a casual examination of the discs. Thus, the operator or participant may place a disc into its proper seat without receiving advance information as to the proper answers to the various questions.

Referring particularly to Figure 1 of the drawings, which is a top plan view of the illustrative embodiment of the invention, a flat open top square box or tray 2 has positioned snugly therein the educational device 4. Device 4 has base 8 and a cover or lid 6 (see Figure 5); the lid is hinged to the base at the left by a hinge 10. Hinge 10 is of the concentric tube type with an inner tubular member 12 integral with lid 6, and an outer tubular portion 14 integral with base 8. Lid 6 and base 8 are of heavy gauge sheet metal so that hinge 10 has substantial rigidity, and the ends of tubular portion 14 extend beyond portion 12 and are squeezed together so that there can be no relative movement and the lid does not slide free of the base. Base 8 is supported within tray 2 by four legs 16, struck from the corner portions of the base and having feet resting on the bottom of the tray.

Base 8 has a shallow circular depression or recess 18, which extends substantially to the four sides of the base, and at the center of this recess there is a collar or cylindrical hub 22 which projects upwardly. Removably positioned within this recess 18 is a flat, rigid cardboard disc 20 which has a central opening 24 through which hub 22 projects so that the disc may rotate within the recess with the hub as its axis. Cover 6 fits snugly on the top surface base 8 so that it extends along the top surface of disc 20 and this holds the disc flat in the recess. Referring now to Figure 1, cover 6 has an arcuate slot or finger opening 26, which extends along the periphery of the disc, and (see also Figure 5) base 8 has a correspondingly shaped slot 27 in alignment therewith. Disc 20 (Figure 4) is printed in an annular zone with ten pictures 28, each of which is at the top of a somewhat segmental space 29; beneath each picture is a question 30 and a group of four numbered answers 31. The disc has at spaced intervals around its periphery, ten semicircular notches or finger recesses 32 which are positioned between the respective picture spaces 29 and have the exact arcuate spacing as the pictures 28. Referring now again to Figure 1, the arcuate length of slot 26 is just sufficient to span two recesses or finger openings 32, so that the operator or player may rotate the disc by inserting his finger into slot 32. This rotation is through a predetermined arc if the finger is inserted into the slot at one end of opening 26, and then moved to the other end of the slot; and, this predetermined arc is the arcuate extent or dimension of the picture spaces 29. As shown at the top central portion of Figure 1, cover 6 has a window 33 therein and slot 26 is so positioned with respect to this window that one of the picture spaces 29 is centrally positioned in this window when two of the slots 32 are positioned at the ends of opening 26. Thus, the operator rotates the disc step-by-step by inserting a finger in one of the finger slots 32 and then moving a finger to the other end of opening 26; and, after each such movement one of the pictures and its question and set of possible answers are centrally positioned within window 33.

As indicated above, a signal light is provided which indicates to the operator when he has selected the correct answer. In this embodiment this signal light is mounted at the center of cover 6 and there is a light bulb 34 which (see Figure 5) is threaded into a screw opening 36 in the lid 6. This screw opening and the base of the bulb project into hub 22, and the bottom central terminal 38 on bulb 34 engages the end 40 of a spring brass contactor 42. Contactor 42 has right angle contactor 45 and is rigidly mounted by a rivet 44 to a semi-cylindrical battery case 46 (see Figure 3), of a resilient, acid-resistant insulating plastic and of such size that it snugly receives a cylindrical dry cell 48 (see Figure also 5) whose outer shell is bare metal. Case 46 has integral side flanges 52 along each of its side edges, and at the end opposite contactor 42 there is an integral end wall 54. Case 46 is held in place on the bottom of base 8 by a pair of brackets 56 (see Figure 2) which have slots 57 into which flanges 52 project. Brackets 56 are integral with base 8 and comprise (Figure 5) a main longitudinal portion and two end portions which project upwardly and are connected to a base 8. Base 8 has a rectangular opening 58 between brackets 56, and the brackets are formed simultaneously with the forming of this opening. The case is assembled prior to the positioning of the dry cell into the case by squeezing the sides of the case toward each other and then letting the case expand due to its own resiliency so that the flanges nest into their respective recesses in the brackets. The dry cell 48 is then inserted into the case and it is positioned with its axial terminal engaging the resilient contactor 45, of bracket 42.

As shown best in Figures 1, 2 and 4, cover 6 has a raised portion 60 which is substantially rectangular with a central protrusion from its left hand side 62, which surrounds the threaded opening 36, for the light bulb 34. On the under side of the cover (see Figure 4) are four elongated resilient spring contactors 64, each of which is soldered at one end (Figure 2) as indicated at 66, to the cover and is bent at the other end to form a contact portion 68, and a push button portion 70. The push button portion includes a vertical stem 69 which extends through a slot 72 in the cover and a horizontal portion which forms a finger button 71 which is engaged and pushed by the operator, and this moves the contact portion 68 toward the dry cell 48. The central portion of disc 20 has ten rectangular openings therein, each of which is of such size that one of the contact portions 68 may move through the opening and engage the shell of dry cell 48, assuming that the opening is in alignment with the contactor. There is one of these openings 74 which corresponds to each of the pictures 28, and which is positioned in a predetermined relationship with respect to its picture. The four finger buttons 71 are numbered (see Figure 1) "1," "2," "3," and "4," and the proposed answers to the question which appear beneath each picture 28 are similarly numbered. The rectangular opening 74 for each picture is so positioned that when that picture is centered in window 33 (Figure 1) the opening 74 is directly beneath the contactor 68 of the push button which is numbered corresponding to the correct answer. Thus, the operator reads the question 30 beneath the picture and selects the answer which he believes to be correct. He then pushes the button 71 which has a number corresponding to the answer which he has selected. If he has selected the correct answer, the contactor portion 68 has an opening in alignment with it and therefore the pushing of the button moves the contact portion through the opening into engagement with the metal shell of the dry cell 48. As pointed out above, cover 6 is of sheet metal and forms an electrical connection between the contactors 64 and the threaded electrical contact sleeve of bulb 34; and, the terminal 38 of the bulb is electrically connected through bracket 42 to terminal 75 of the dry cell. Therefore, if a contact portion 68 of any one of the contactors 64 moves into engagement with the metal shell of the dry cell, an electrical circuit is set up connecting the dry cell across the terminals of the battery with the result that the bulb is lighted.

If the operator depresses a finger button 71 other than the one corresponding to the correct answer, the contactor portion 68 engages the top surface of disc 20, and therefore, there is no engagement between the contactor and the shell of the dry cell, and the light does not go on. Referring to Figure 2, it is assumed that the contactor at the left is the one corresponding to the correct answer and, therefore, disc 20 has an opening in alignment with this contactor so that this contactor can move into engagement with the dry cell. However, the disc extends beneath the contactor at the right and, therefore, the depressing of the right-hand finger button does not establish contact with the dry cell.

Under some circumstances the electric light bulb is mounted in the base member and the cover member then has a window through which the bulb may be seen, or the light from the bulb passes. It is also contemplated that the base and cover member may be made of plastic, it being understood that electrical circuit means is provided.

The invention accordingly consists in the features of construction, combinations of elements, and arrangements of parts as will be exemplified in the structure to be hereinafter described and the scope of the application of which will be indicated in the following claims.

I claim:
1. An indicia sheet of the character described comprising a disk of cardboard or the like, said sheet having a central opening which is adapted to receive a hub portion to assist in guiding the sheet during movement, said sheet also having an annular indicia zone bearing a row of indicia, each of which includes a picture or the like and a list of possible identifying terms whereby there may be a choice of an appropriate correct term based upon knowledge with respect to the picture or the like, said element also having an annular code zone within which there are code openings which are positioned in a definite relationship each with respect to one of said indicia and particularly with respect to the correct term with respect to its indicia, and said sheet also having an annular zone containing finger receiving openings within which a person may place his finger to rotate the sheet a predetermined distance and to a position having a definite relationship with respect to one of said indicia.

2. In a device of the character described, the combination of, tray means having an upwardly projecting central hub portion and a surrounding zone, a sheet rotatably mounted on said hub portion within said zone and having three concentrically positioned annular zones one of which is an indicia zone wherein the sheet bears a row of indicia each of which bears a representation and a list of possible identifying terms whereby there may be a choice of an appropriate correct term based upon knowledge with respect to the representation of that indicia, said sheet having in another of said annular zones a number of code openings corresponding in number with said indicia and each of which is positioned in a predetermined relationship with respect to its indicia and particularly with respect to the correct term of its indicia, said sheet having in the other of said annular zones a plurality of finger engaging openings by which the sheet may be engaged for rotation, a cover positioned over said sheet and resting on said tray means and having a window through which one of said indicia is exposed and also having a slot through which a finger may be projected to engage said finger engaging openings, and an electric circuit assembly having elements mounted upon said tray means and having switch element means adapted to project along predetermined paths through said code openings in said sheet when the respective code openings are in alignment with said paths, whereby the sheet may be moved to a path position wherein one of said indicia is exposed and a switch element means may be projected along a path corresponding to the correct term of the indicia through the code opening thereby to close the electric circuit.

JAMES E. BROWN.

References Cited in the file of this patent

UNITED STATES PATENTS

| Number | Name | Date |
| --- | --- | --- |
| 2,030,175 | Le Fevre | Feb. 11, 1936 |
| 2,062,453 | Hastings | Dec. 1, 1936 |
| 2,311,055 | Kopas | Feb. 16, 1943 |
| 2,507,215 | Miltenberg | May 9, 1950 |
| 2,545,381 | Prentice | Mar. 13, 1951 |